(12) United States Patent
Davydov

(10) Patent No.: US 11,115,241 B2
(45) Date of Patent: Sep. 7, 2021

(54) DM-RS GROUPING AND CSI REPORTING FOR COMP

(71) Applicant: Apple Inc., Cupertino, CA (US)

(72) Inventor: Alexei Vladimirovich Davydov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 35 days.

(21) Appl. No.: 16/496,753

(22) PCT Filed: Mar. 23, 2018

(86) PCT No.: PCT/US2018/024022
§ 371 (c)(1),
(2) Date: Sep. 23, 2019

(87) PCT Pub. No.: WO2018/175884
PCT Pub. Date: Sep. 27, 2018

(65) Prior Publication Data
US 2020/0036555 A1  Jan. 30, 2020

Related U.S. Application Data

(60) Provisional application No. 62/547,685, filed on Aug. 18, 2017, provisional application No. 62/476,592, filed on Mar. 24, 2017.

(51) Int. Cl.
*H04W 4/00* (2018.01)
*H04L 25/02* (2006.01)
(Continued)

(52) U.S. Cl.
CPC ....... *H04L 25/0224* (2013.01); *H04B 7/0626* (2013.01); *H04L 5/0035* (2013.01);
(Continued)

(58) Field of Classification Search
None
See application file for complete search history.

(56) References Cited

U.S. PATENT DOCUMENTS

| 2015/0023280 A1 | 1/2015 | Kim et al. |
| 2015/0271812 A1 | 9/2015 | Nam et al. |

(Continued)

FOREIGN PATENT DOCUMENTS

| WO | WO-2018175884 A2 | 9/2018 |
| WO | WO-2018175884 A3 | 11/2018 |

OTHER PUBLICATIONS

Huawei, Hisilicon; "Potential enhancements and specification impact analysis of non-coherent JT"; 3GPP TSG RAN WG1 Meeting #86bis R1-1608610; Lisbon, Portugal, Oct. 10, 2016; 5 Pages.
(Continued)

*Primary Examiner* — Elisabeth Benoit Magloire
(74) *Attorney, Agent, or Firm* — Kowert, Hood, Munyon, Rankin & Goetzel, P.C.

(57) ABSTRACT

Described herein is a channel state information (CSI) calculation method for non-coherent joint transmission by using a dependency between CSI reported for each CSI. In one embodiment, configuration of CSI reporting is such that CSI calculated for one CSI process (denoted as the reference CSI process) can be used for interference calculation for another CSI process (denoted as the dependent CSI process).

20 Claims, 9 Drawing Sheets

(51) Int. Cl.
*H04B 7/06* (2006.01)
*H04L 5/00* (2006.01)
*H04W 76/27* (2018.01)

(52) U.S. Cl.
CPC .......... *H04L 5/0051* (2013.01); *H04L 5/0057* (2013.01); *H04L 5/0094* (2013.01); *H04W 76/27* (2018.02)

(56) References Cited

U.S. PATENT DOCUMENTS

| | | | | |
|---|---|---|---|---|
| 2015/0365154 | A1* | 12/2015 | Davydov | H04B 7/0626 370/329 |
| 2016/0021551 | A1 | 1/2016 | Park et al. | |
| 2016/0100384 | A1 | 4/2016 | Etemad et al. | |
| 2018/0042028 | A1* | 2/2018 | Nam | H04B 7/0626 |
| 2018/0323830 | A1* | 11/2018 | Park | H04B 7/024 |
| 2019/0045488 | A1* | 2/2019 | Park | H04B 7/024 |
| 2019/0222274 | A1* | 7/2019 | Dou | H04B 7/0465 |
| 2020/0036555 | A1* | 1/2020 | Davydov | H04L 5/0094 |
| 2020/0221487 | A1* | 7/2020 | Lee | H04L 5/0044 |
| 2020/0274667 | A1* | 8/2020 | Kim | H04W 72/042 |
| 2020/0287699 | A1* | 9/2020 | Su | H04W 72/042 |
| 2021/0007124 | A1* | 1/2021 | Zhou | H04B 7/0695 |

OTHER PUBLICATIONS

Intel Corporation; "Discussion on the remaining details of CSI Feedback for eIMTA"; 3GPP TSG RAN WG1 Meeting #76bis R1-141551; Shenzen, China; Mar. 31, 2014; 4 Pages.

Catt; "On interference measurement enhancement for multi-user MIMO operation"; 3GPP TSG RAN WG1 Meeting #85 R1-164223; Nanjing, China; May 23, 2016; 5 Pages.

Huawei, Hisilicon; "CSI enhancements for non-coherent JT"; 3GPP TSG RAN WG1 Meeting #87 R1-1611178; Reno, USA; Nov. 14, 2016; 3 Pages.

Intel Corporation; "Enhancements and TP for CS/CB CoMP for FD-MIMO"; 3GPP TSG RAN WG1 Meeting #88 R1-1702172; Athens, Greece; Feb. 13, 2017; 3 Pages.

Huawei, Hisilicon; "Discussion on enhancements for non-coherent JT"; 3GPP TSG RAN WG1 Meeting #88 R1-1703063; Athens, Greece; Feb. 13, 2017; 6 Pages.

Extended European Search Report for Patent Application No. EP 18771967; dated Nov. 26, 2020; 10 Pages.

"International Application Serial No. PCT/US2018/024022, International Search Report dated Sep. 27, 2018", 11 pgs.

"International Application Serial No. PCT/US2018/024022, Written Opinion dated Sep. 27, 2018", 10 pgs.

Intel, Corporation, "Enhancement and TP for non-coherent JT", R1-1702171, 3GPP TSG RAN WG1 Meeting #88, Athens, Greece, (Feb. 7, 2017), 5 pages.

* cited by examiner

| NUMBER OF MIMO LAYERS | FIRST DM-RS ANTENNA GROUP | SECOND DM-RS ANTENNA GROUP |
|---|---|---|
| 2 | 7 | 8 |
| 3 | 7, 8 | 9 |
| 4 | 7, 8 | 9, 10 |
| 5 | 7, 8, 9 | 9, 10, 11 |
| 6 | 7, 8, 9 | 9, 10, 11, 12 |
| 7 | 7, 8, 9, 10 | 11, 12, 13 |
| 8 | 7, 8, 9, 10 | 11, 12, 13, 14 |

Fig. 9

DM-RS GROUPING AND CSI REPORTING FOR COMP

PRIORITY CLAIM

This application is a U.S. Nationa Stage Filing under 35 U.S.C. 371 from International Application No. PCT/US2018/024022, filed Mar. 23, 2018, which claims priority to U.S. Provisional Patent Application Ser. Nos. 62/476,592 filed Mar. 24, 2017 and 62/547,685 filed Aug. 18, 2017, each of which are incorporated herein by reference in their entirety.

TECHNICAL FIELD

Embodiments described herein relate generally to wireless networks and communications systems. Some embodiments relate to cellular communication networks including 3GPP (Third Generation Partnership Project) networks, 3GPP LTE (Long Term Evolution) networks, 3GPP LTE-A (LTE Advanced), and 3GPP fifth generation (5G) or new radio (NR) networks, although the scope of the embodiments is not limited in this respect.

BACKGROUND

A major feature of future LTE and NR systems is increased support for Coordinated Multi-Point (CoMP). In CoMP for the downlink, multiple cells each having a transmission point (TP) coordinate with one other in transmitting to mobile devices or terminals, referred to as user equipments (UEs) in LTE, so as to result in reduced interference and/or enhanced signal strength.

BRIEF DESCRIPTION OF THE DRAWINGS

FIG. 9 illustrates an example grouping of DM-RS ports according to some embodiments.

DETAILED DESCRIPTION

CoMP involves multiple transmission points or cells coordinating their individual transmissions so that a target UE experiences enhanced signal reception and/or reduced interference. A TP of a cell participating in CoMP may be a base station, referred to as an evolved Node B (eNB) in LTE, or may be a remote radio head (RRH) operated by an eNB. Techniques for performing COMP may be broadly classified into two categories: coordinated scheduling and coordinated beamforming (CS/CB) and joint transmission (JT). CS/CB involves multiple coordinated cells sharing channel state information (CSI) for multiple UEs, while the user plane data that is transmitted to a particular UE is transmitted from only one TP. JT involves multiple coordinated TPs transmitting the same user plane data to a particular UE with appropriate beamforming weights. JT may be performed coherently or non-coherently. In principle, CoMP mimics a large distributed MIMO system by letting a subset of TPs share their resources to jointly serve a subset of users. In non-coherent JT, TPs cooperate by jointly transmitting the same data to a given user without prior phase mismatch correction and tight synchronization. The primary focus of this disclosure is on non-coherent JT or NC-JT.

In order for a set of cooperating cells to employ JT in transmitting to a particular target UE, knowledge of the downlink channels that exist between the TPs of the cells and the target UE needs to be obtained. The UE also needs to make proper assumptions regarding the large-scale properties of the downlink channels between it and the TPs in order to correctly demodulate downlink data. These issues are addressed below.

Example Radio Architecture

Figure 1:
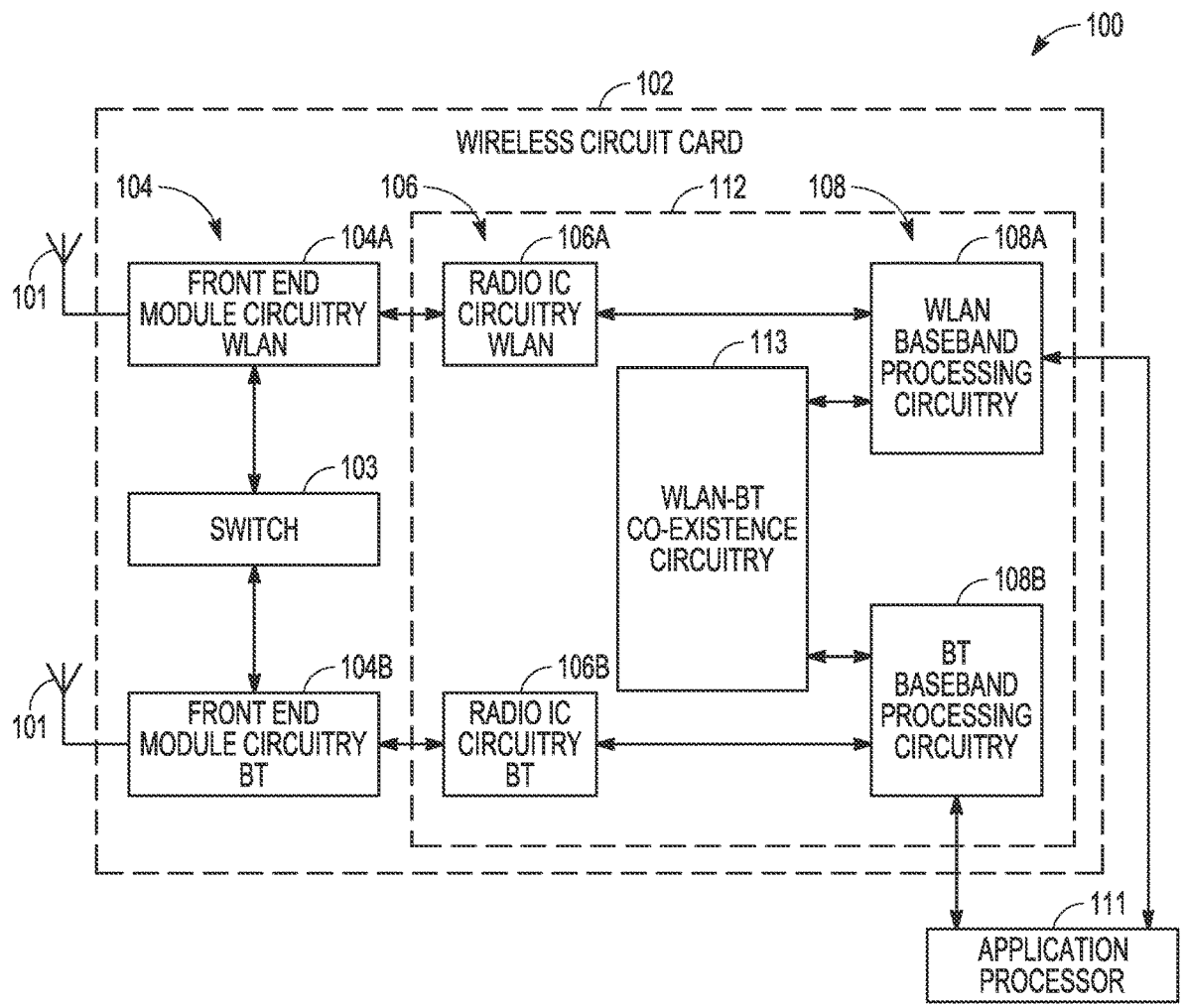
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104B may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 102, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106a may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 110 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
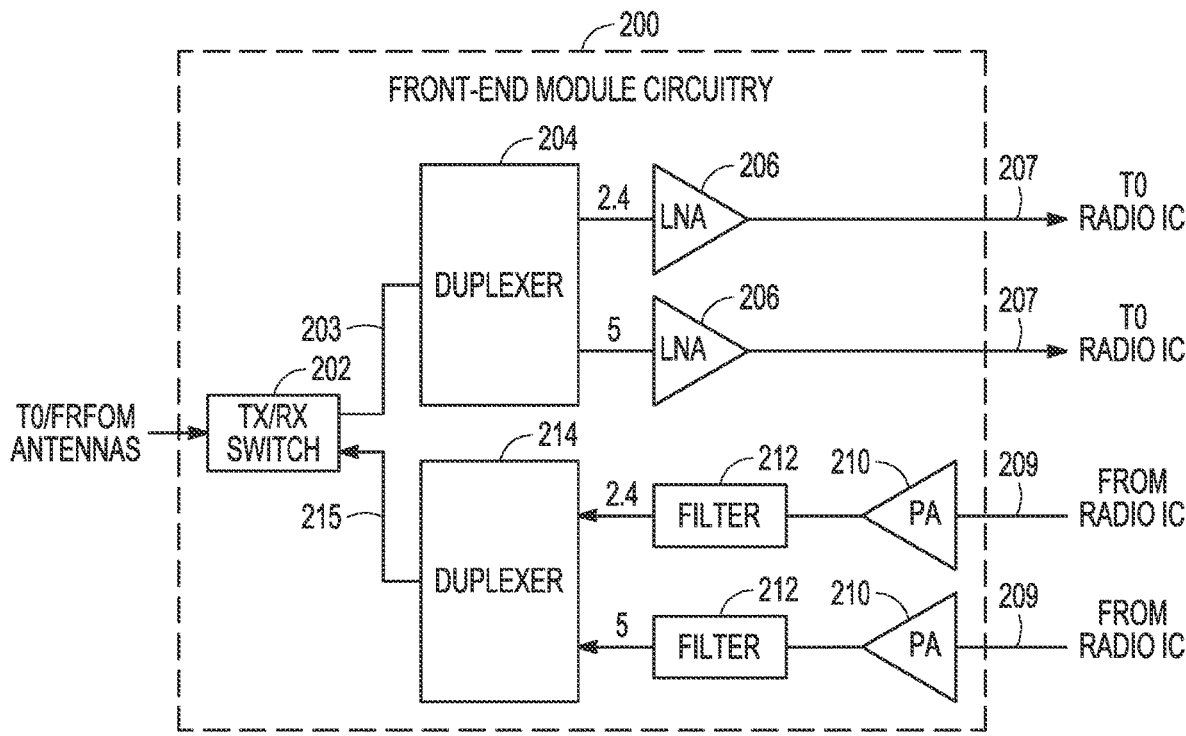
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
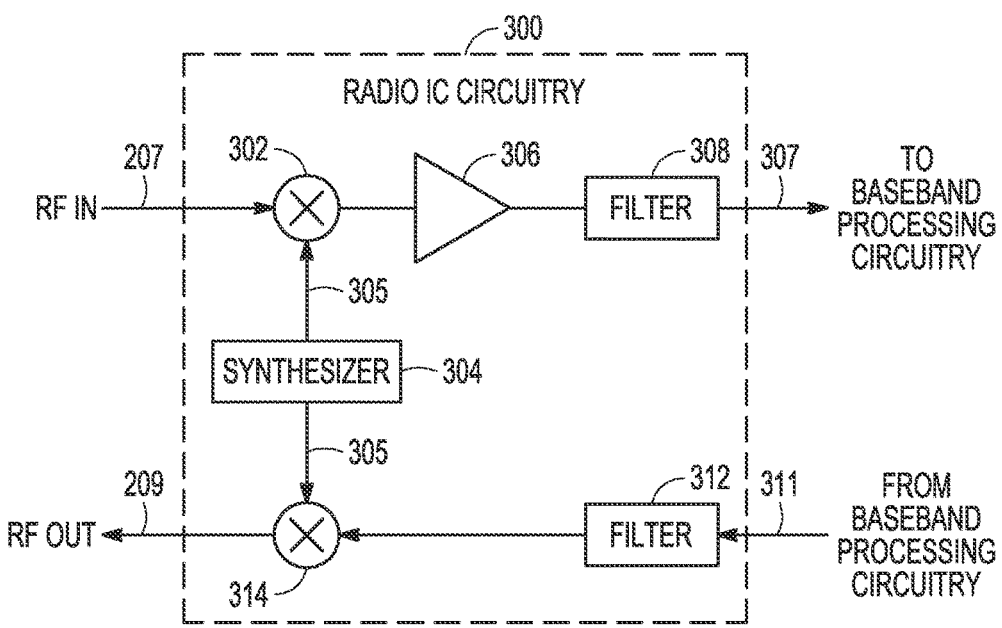
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 110 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 110.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$)).

Figure 4:
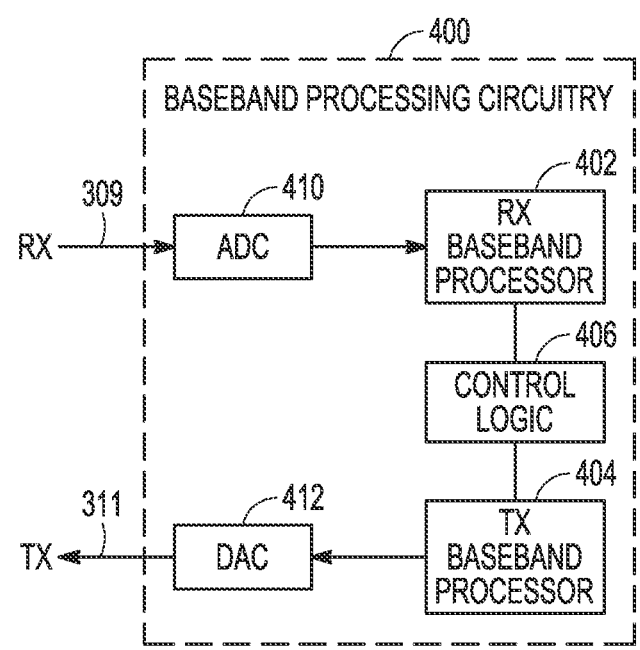
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108a, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Example Machine Description

Figure 5:
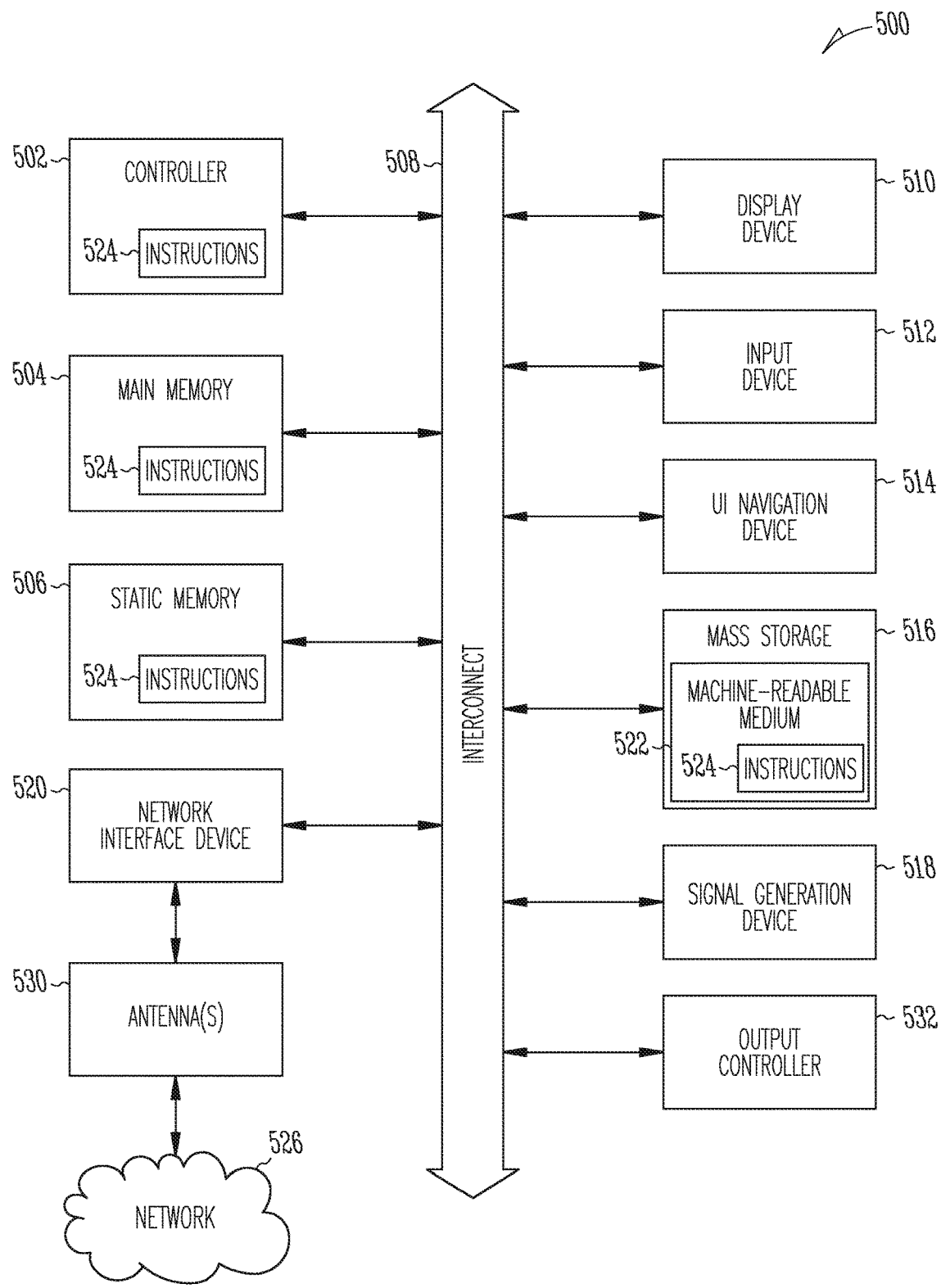
FIG. 5 illustrates an example of a computing machine such as an evolved Node B (eNB) or next generation evolved node B (gNB) according to some embodiments.

FIG. 5 illustrates a block diagram of an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a user equipment (UE), evolved Node B (eNB), next generation evolved Node B (gNB), next generation access network (AN), next generation user plane function (UPF), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. The term "transmission medium" shall be taken to include any intangible medium that is capable of storing, encoding, or carrying instructions for execution by the machine 500, and includes digital or analog communications signals or other intangible medium to facilitate communication of such software.

Example UE Description

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 6:
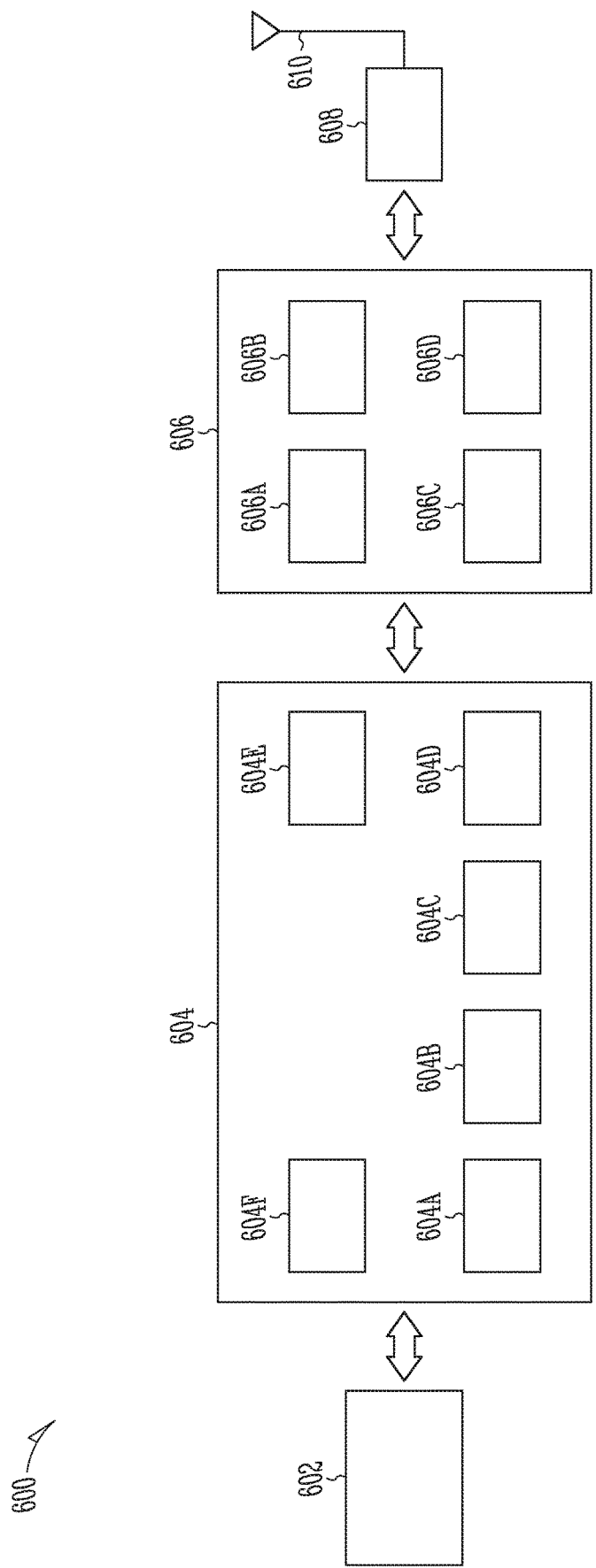
FIG. 6 illustrates an example of a user equipment (UE) device according to some embodiments.

Embodiments described herein may be implemented into a system using any suitably configured hardware and/or software. FIG. 6 illustrates, for one embodiment, example components of a User Equipment (UE) device 600. In some embodiments, the UE device 600 may include application circuitry 602, baseband circuitry 604, Radio Frequency (RF) circuitry 606, front-end module (FEM) circuitry 608 and one or more antennas 610, coupled together at least as shown.

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 604 may include circuitry such as, but not limited to, one or more single-core or multi-core processors. The baseband circuitry 604 may include one or more baseband processors and/or control logic to process baseband signals received from a receive signal path of the RF circuitry 606 and to generate baseband signals for a transmit signal path of the RF circuitry 606. Baseband processing circuity 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or other baseband processor(s) 604d for other existing generations, generations in development or to be developed in the future (e.g., fifth generation (5G), 6G, etc.). The baseband circuitry 604 (e.g., one or more of baseband processors 604a-d) may handle various radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an evolved universal terrestrial radio access network (EUTRAN) protocol including, for example, physical (PITY), media access control (MAC), radio link control (RLC), packet data convergence protocol (PDCP), and/or radio resource control (RRC) elements. A central processing unit (CPU) 604e of the baseband circuitry 604 may be configured to run elements of the protocol stack for signaling of the PHY, MAC, RLC, PDCP and/or RRC layers. In some embodiments, the baseband circuitry may include one or more audio digital signal processor(s) (DSP) 604f. The audio DSP(s) 604f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RE output signals to the FEM circuitry 608 for transmission.

In some embodiments, the RF circuitry 606 may include a receive signal path and a transmit signal path. The receive signal path of the RF circuitry 606 may include mixer circuitry 606a, amplifier circuitry 606b and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path may include two or more mixers and may be arranged for quadrature downconversion and/or upconversion respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and/or direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610.

In some embodiments, the FEM circuitry 608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610.

In some embodiments, the UE device 600 may include additional elements such as, for example, memory/storage, display, camera, sensor, and/or input/output (I/O) interface.

Descriptions of Embodiments

Figure 7:
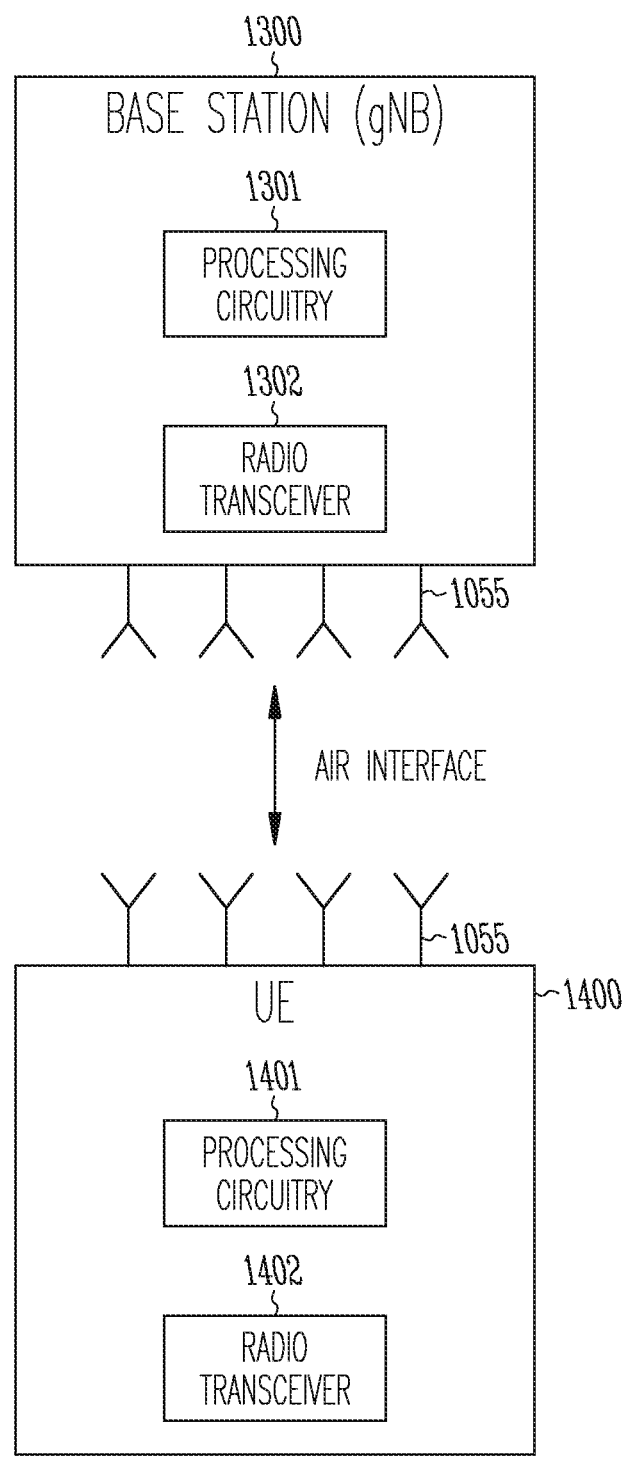
FIG. 7 illustrates an example UE and a base station (BS) such as an eNB or gNB according to some embodiments.

In Long Term Evolution (LTE) and 5G systems, a mobile terminal (referred to as a User Equipment or UE) connects to the cellular network via a base station (BS), referred to as an evolved Node B or eNB in LTE systems and as a next generation evolved Node B or gNB in 5G or NR systems. FIG. 7 illustrates an example of the components of a UE 1400 and a base station (e.g., eNB or gNB) 1300. The BS 1300 includes processing circuitry 1301 connected to a radio transceiver 1302 for providing an air interface. The UE 1400 includes processing circuitry 1401 connected to a radio transceiver 1402 for providing an air interface over the wireless medium. Each of the transceivers in the devices is connected to antennas 1055. The waveform used in LTE and NR is cyclic prefix orthogonal frequency division multiplexing (CP-OFDM) for the downlink (DL). The CP-OFDM waveform can be can be used for single-stream and multi-stream (i.e., multi-input multi-output or MIMO) transmissions. The memory and processing circuitries of the UE and/or BS may be configured to perform the functions and implement the schemes of the various embodiments described herein.

The air interface for NR and LTE, also referred to as the radio interface or radio access network (RAN), has a layered protocol architecture where peer layers of the UE and gNB pass protocol data units (PDUs) between each other that are encapsulated service data units (SDUs) of the next higher layer. The protocol architecture may be basically described as follows. In the control plane, the radio resource control (RRC) layer is in control of radio resource usage and communicates with the packet data compression protocol (PDCP) layer via signaling radio bearers. In the user plane, the PDCP layer receives radio bearers to which are mapped IP (internet protocol) packets. The PDCP layer communicates with the radio link control (RLC) layer via the radio bearers, and the RLC layer communicates with the medium access control (MAC) layer through logical channels. The MAC layer communicates via transport channels with the physical layer (PHY). The primary transport channels used for the transmission of data, the uplink shared channel (UL-SCH) and downlink shared channel (DL-SCH), are mapped to the physical uplink shared channel (PUSCH) and physical downlink shared channel (PDSCH), respectively, at the physical layer.

Data on a transport channel is organized into transport blocks (TBs) by the MAC layer. In each transmission time interval (TTI), at most one transport block of dynamic size is transmitted over the radio interface to/from a device in the absence of spatial multiplexing. In the case of spatial multiplexing (MIMO), there can be up to two transport blocks per TTI. The physical layer performs channel coding and layer mapping for each TB. The TB may also be segmented into multiple code blocks to which the channel coding is applied that together make up a codeword (CW) that corresponds to the TB. After coding, the CW is mapped to one or more layers. In the case of transmission mode 10, for example, each CW may be mapped to up to four layers. The layers are then mapped to antenna ports by means of a precoding matrix where the maximum number of layers is less than or equal to the number of available antenna ports. Reference signals for a particular UE to use in demodulating the DL data, referred to as demodulation reference signals (DM-RSs) are also included, where each DM-RS corresponds to an antenna port. Precoding is also applied to the DM-RSs to allow for demodulation and recovery of the transmitted layers at the receiver side without explicit receiver knowledge of the precoding applied at the transmitter side. Channel estimation based on the precoded DM-RSs will reflect the channel experienced by the layers, including the precoding, and can then be used directly for coherent demodulation of the different layers.

The LE receives control information from the base station via the physical downlink control channel (PDCCH). The downlink control information (DCI) carried by the PDCCH may schedule transmission of a PDSCH identify the antenna ports, MIMO (multi-input multi-output) layers, and TBs of the PDSCH to be transmitted.

Figure 8:
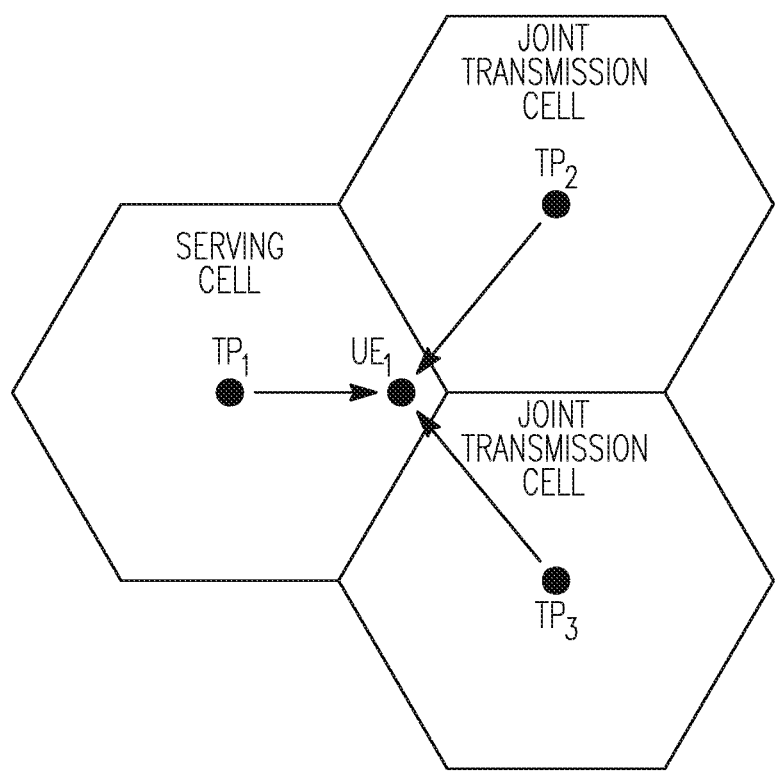
FIG. 8 illustrates an example of joint transmission according to some embodiments.

FIG. 8 illustrates the operation of downlink CoMP for case of JT. In FIG. 8, the serving cell $TP_1$ and the other coordinating cells $TP_2$ and $TP_3$ all jointly transmit to the cell edge terminal $UE_1$. The non-coherent transmission of different MIMO layers from different TPs achieves additional spatial multiplexing gain at the terminal. In order to perform this function, as well to select the optimum configuration of TPs, the serving cell needs to know the downlink channel from each TP to the target UE. LTE provides reference signals that may be used by a UE to obtain downlink channel state information (CSI) for a transmitting cell, referred to as channel state information reference signals (CSI-RSs). The UE may then feedback the CSI thus obtained to the serving cell in the form of a CSI report.

CSI-RS are transmitted using REs otherwise allocated to the PDSCH with a configurable periodicity and spanning the entire transmit band. Multiple sets of CSI-RSs may be transmitted by a cell with each set corresponding to a different antenna port. A UE may use the CSI-RSs to estimate the channel and produce a CSI report that is fed back to the serving cell via the physical uplink control channel (PUCCH) or physical uplink shared channel (PDSCH). A channel state information report may include a channel quality indicator (CQI) that represents the highest modulation and coding scheme that could be used in the channel without exceeding a specified error rate, a rank indicator (RI) that represents the number of spatial multiplexing layers that could be used in the channel, a precoding matrix indicator (PMI) that represents a preferred antenna weighting scheme for transmitting to the UE, a sub-band (SB) indicator that represents the subcarriers preferred by the UE, and a CSI-RS resource indicator (CRI) to indicate a preferred antenna beam. In order to configure a UE to receive and process reference signals and to provide appropriate feedback in the form of channel state information reports, the eNB signals the UE using the radio resource control (RRC) protocol. An RRC message that transmits CSI-RS configuration information from an eNB to a UE originates in the RRC layer of the eNB and, after traversing the protocol layers, is then transmitted to the UE via the PDSCH. The UE then processes the message at its corresponding RRC layer. The UE may be configured with multiple CSI processes where a CSI process be made up of a non-zero-power (NZP) CSI resource a zero-power CSI interference measurement (CSI-IM) resource for measuring interference.

In conventional systems, CSI reporting is provided assuming coherent processing from all antenna ports. In the case of non-coherent JT (NC-JT), however, an interference measurement for a CSI report to a TP that does not include the DL transmission of another jointly transmitting TP may underestimate the interference that will actually be experienced by the UE.

Described herein is a CSI calculation method for non-coherent JT dependencies between CSI reported from different TPs and CSI processes. In one embodiment, configuration of CSI reporting is such that CSI calculated for one CSI process (denoted as the reference CSI process) can be used for interference calculation for another CSI process (denoted as the dependent CSI process), where each of the CSI processes is associated with a different TP.

In one embodiment, the UE can be configured with multiple CSI process, where a CSI process contains a configuration of a NZP CSI-RS resource (or identification (ID) of a NZP CSI-RS resource) for channel measurement, a CSI-IM resource (or ID of CSI-IM resource) for interference measurements, and the ID of the reference CSI process for interference measurements. If the ID of the reference CSI process is configured, the UE should use channel measurements obtained from the NZP CSI-RS resource of the reference CSI process and reported/calculated CSI (e.g., CRI, RI and PMI) of that process to calculate the interference for a given CSI process together with interference measurements obtained on the configured CSI-IM resource.

For example, assume that the UE has calculated CSI information (PMI/RI/CQI) for the link between a first TP and the UE. Then, for NC-JT when the first TP transmits certain number of MIMO layers to the UE, this transmission also creates interference to the transmission of certain MIMO layers to the UE from a second TP. Considering that the UE has already calculated CSI information for the link between the first TP and the UE, and that CSI information will be used by the first TP to transmit MIMO layers to the UE, the UE can more accurately predict interference from the first TP when calculating CSI information for the link between the second TP and the UE.

A configuration for a second CSI process that targets the link between the second TP and the UE has a reference CSI process ID corresponding to the link between the first TP and the UE. For the second CSI process, the CSI-IM should be configured in such way so that UE measures interference from all TPs excluding the first and second TPs. The interference caused to the second TP by the first TP may be calculated by measuring the channel matrix H on the NZP-CSI-RS resource transmitted by the first TP, multiplying the estimated channel by a precoding matrix that corresponds to the reported PMI/RI information for that CSI process, and then calculating an interference covariance matrix. By combining the interference at the UE using the CSI-IM resource and the interference from the first TP, the UE has a more accurate interference information for the link between the second TP and the UE to calculate CSI In one embodiment, for aperiodic CSI reporting, UE is configured to expect a report request for CSI process configured with the ID of a reference CSI process also always requests the reference CSI process. That is, the UE should not expect an aperiodic CSI request for a CSI process configured with ID of the reference CSI process without a CSI request for the reference CSI process.

In one embodiment, a CSI process configured with the ID of a reference CSI process can be also used for periodic CSI reporting. For periodic CSI reporting, the CSI components or types (i.e. RI, PMI and CQI) are typically reported in different subframes. In this case, the UE may be configured to only use CSI components of the fully reported CSI of the reference CSI process to calculate the interference for the CSI process. In this embodiment fully reported may corresponds to reported sets of {CRI, RI, PMI, CQI}, {CRI, RI, PMI}, {RI, PMI}, or {RI, PMI, CQI}. The UE may be configured to not use CRI (if applicable), RI, PMI of the reference CSI process if not all of them are reported by the UE for the reference CSI process. In another embodiment, in the absence of the any reported CRI (if applicable), RI, PMI, the UE may be configured to use the default values of CRI, RI, PMI corresponding to the CRI=0 (if applicable), RI=1 and PMI with lowest index and allowed by the codebook subset restriction. In another embodiment, the UE configured to not expect periodic CSI reporting for a CSI process configured with the ID of a reference CSI process. In this case, periodic CSI reporting is not supported for the dependent CSI process. In another embodiment, the UE is configured not to expect that the ID of a dependent CSI process configured with the ID of a reference CSI process is used as the ID of a reference CSI process in another CSI process.

When a UE attempts to decode its received PDSCH, it has to first estimate the instantaneous channel using the associated DMRSs. In order to do this, the UE also needs knowledge of certain large-scale properties of the channel. Examples of these large-scale properties are power delay profile, delay spread, and Doppler shift of the channel. When the large-scale properties of the channels between a UE and two antenna ports can be assumed to be same, the antenna ports are said to be quasi-co-located (QCL-ed). According to the current LTE specifications, a UE may be configured with one of two quasi-co-location types for the serving cell by RRC signaling. In QCL type A, the UE may assume the cell-specific reference signal (CRS), DMRS, and CSI-RS antenna ports of a serving cell are quasi-co-located. That is, all ports are assumed to be QCL-ed. In QCL type B, the UE may assume the CSI-RS antenna ports corresponding to the CSI-RS resource configuration identified by the higher-layer signaling and the DMRS antenna ports associated with the PDSCH are quasi-co-located.

As noted above, LTE supports two types of quasi co-location (QCL) assumptions for DM-RS antenna ports: QCL type A and QCL type B. For both QCL types it is assumed that all DM-RS antenna ports are QCL-ed with each other, which prevents use of the non-coherent joint transmission schemes where the DM-RS antenna ports are transmitted from different transmission points (TPs) and, therefore, should not be QCL-ed with each other. Therefore, a new QCL, assumption for DM-RS antenna ports, e.g. QCL type C, allowing non QCL-ed DM-RS antenna ports is proposed, referred to herein as QCL type C.

To reduce the UE complexity in QCL type C. DM-RS antenna port divided into groups, where DM-RS antenna ports in the same group can be assumed as QCL-ed with each other. For example, the DM-RS antenna ports may be grouped into two QCL, groups based on the association to the codeword (CW). In other words, all DM-RS antenna ports corresponding to MIMO layers transmitted by the same CW should be assumed as QCL-ed with each other with respect to all large scale parameters, while DM-RS antenna ports transmitted by MIMO layers from different CWs should not be assumed as QCL-ed with each other. An example of two groups of DM-RS antenna ports 7-14 depending on the total number of MIMO layers is shown in FIG. 9 for an initial transmission.

In one embodiment, where there is a failure to demodulate two transport blocks (TBs) failure in an initial transmission, DM-RS antenna ports grouping in a retransmission may be assumed to be the same as for the initial transmission (e.g., as shown in the example of FIG. 9). In case of only one TB failure in the initial transmission, on the other hand, all DM-RS antenna ports for retransmission may be assumed as QCL-ed.

Figure 10:
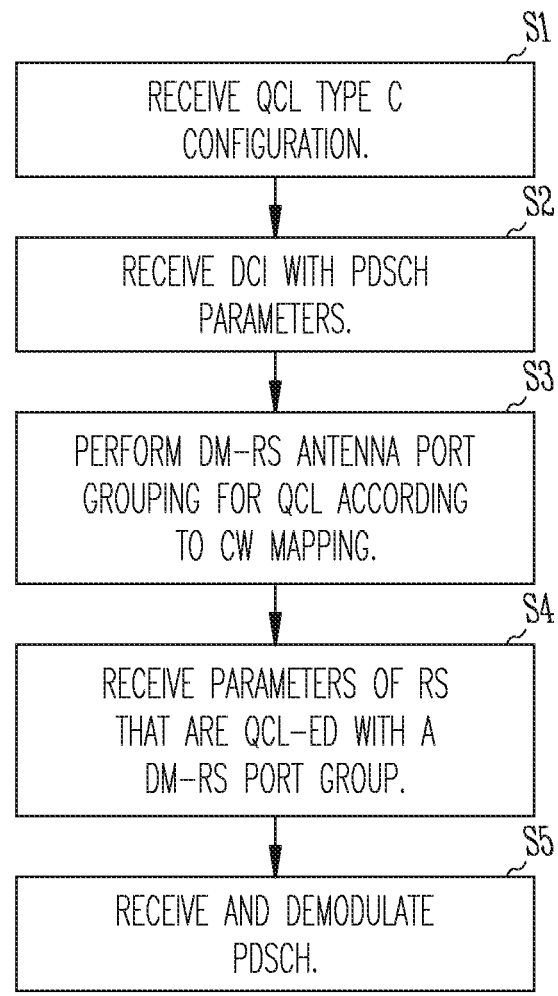
FIG. 10 illustrates an example procedure followed by a UE in receiving a quasi-co-location information according to some embodiments.

In another embodiment, downlink control signaling to the UE may include an indication of other reference signals such as CRS and CSI-RS that should be assumed as QCL-ed with a corresponding DM-RS antenna port group. An example of a procedure followed by a UE in this embodiment is illustrated by FIG. 10. At stage S1, the UE receives a QCL type C configuration from BS. At stage S2, the UE receives downlink control information with parameters of a PDSCH. At stage S3, the UE performs DM-RS antenna port grouping for QCL according to CW mapping. At stage S4, the UE receives parameters of RSs (e.g., CSI or CRS) that should be assumed to be QCL-ed with each DM-RS port group. At stage S5, the UE receives and demodulates the PDSCH.

Additional Notes and Examples

In Example 1, an apparatus for a user equipment (UE), the apparatus comprises: memory and processing circuitry, wherein the processing circuitry is to: decode a radio resource control (RRC) configuration message from a base station (BS) that configures the LIE with first and second channel state information (CSI) processes for reporting CSI based upon CSI reference signals (CSI-RS) transmitted from coordinated multi-point (CoMP) transmission points (TPs); wherein each of the first and second CSI processes has a configuration that includes a CSI process identification (ID), a non-zero power (NZP) CSI-RS resource for channel measurement, and a CSI interference measurement (CSI-IM) resource for interference measurement; wherein the second CSI process configuration further includes the ID of the first CSI process to indicate that the first CSI process is a reference CSI process for the second CSI process; calculate a channel estimate and an interference estimate for the first CSI process, wherein the channel estimate for the first CSI process is based upon measurement of the NZP CSI-RS resource belonging to the first CSI process and the interference estimate for the first CSI process is based upon measurement of the CSI-IM resource belonging to the first CSI process; calculate a channel estimate and an interference estimate for the second CSI process, wherein the channel estimate for the second CSI process is based upon measurement of the NZP CSI-RS resource belonging to the second CSI process and the interference estimate for the second CSI process is based upon measurement of the CSI-IM resource belonging to the second CSI process combined with the channel estimate for the first CSI process; encode a first CSI report for the first CSI process and a second CSI report for the second CSI process for transmission to the BS; and, store the calculated channel and interference estimates for the first and second CSI processes in memory.

In Example 2, the subject matter of Example 1 or any of the Examples herein may optionally include wherein the processing circuitry is not to include the reference CSI process in the CSI configuration for the second CSI process when the CSI configuration for the second CSI process does not include an ID for another CSI process.

In Example 3, the subject matter of Example 1 or any of the Examples herein may optionally include wherein the processing circuitry is to, in order to estimate interference for the second CSI process, use the measurement of the CSI-IM resource belonging to the second CSI process combined with channel measurements obtained from the NZP CSI-RS resource of the reference CSI process and components of the first CSI report for the first CSI process that include any or all of a CQI (channel quality indicator), CRI (CSI-RS resource indicator), RI (rank indicator) and PMI (precoding matrix indicator).

In Example 4, the subject matter of Example 3 or any of the Examples herein may optionally include wherein the processing circuitry is only to use components of the first CSI report for the reference CSI process to calculate the interference estimate for the second CSI process after the first CSI report for the reference CSI process has been completed.

In Example 5, the subject matter of Example 4 or any of the Examples herein may optionally include wherein the first CSI report for the reference CSI process is deemed completed when {CRI, RI, PMI, CQI} are reported, when {CRI, RI, PMI} are reported, when {RI, PMI} are reported, or when {RI, PMI, CQI} are reported, wherein a PMI is reported when i1 and i2 indices are reported.

In Example 6, the subject matter of Example 3 or any of the Examples herein may optionally include wherein the processing circuitry is to, in the absence of any of the CRI, RI, or PMI calculated by the reference CSI process, calculate the interference estimate for the second CSI process using the default values of the CRI, RI, or PMI corresponding to CRI=0, RI=1 and a PMI equal to the lowest index allowed by a codebook subset restriction of the reference CSI process.

In Example 7, the subject matter of Example 1 or any of the Examples herein may optionally include wherein the processing circuitry is to expect an aperiodic CSI request for a CSI process configured with an ID of a reference CSI process to be accompanied by a CSI request for that reference CSI process.

In Example 8, the subject matter of Example 1 or any of the Examples herein may optionally include wherein the processing circuitry is not to expect periodic CSI reporting for the second CSI process configured with the ID of the reference CSI process In Example 9, the subject matter of Example 1 or any of the Examples herein may optionally include wherein the processing circuitry is not to expect that the ID of the second CSI process configured with ID of the reference CSI process would be used as a reference CSI process for another CSI process.

In Example 10, the subject matter of Example 1 or any of the Examples herein may optionally include a radio transceiver and wherein the processing circuitry is to cause the radio transceiver to transmit CSI reports for the first and second CSI processes to a base station.

In Example 11, an apparatus for a user equipment (UE), the apparatus comprises: memory and processing circuitry, wherein the processing circuitry is to: decode a radio resource control (RRC) configuration message from a base station (BS) that configures the UE with a type C quasi-co-location (QCL) configuration, wherein the type C QCL configuration specifies that demodulation reference signal (DM-RS) antenna ports used to transmit a same codeword (CW) or transport block (TB) in a physical downlink shared channel (PDSCH) are considered to be a quasi-co-located group; decode downlink control information (DCI) in a physical downlink control channel (PDCCH) that schedules transmission of the PDSCH and identifies the DM-RS antenna ports, MIMO (multi-input multi-output) layers, and TBs of the PDSCH to be transmitted by the BS as well as whether it is an initial transmission or retransmission; and, demodulate the PDSCH by using DM-RSs in the PDSCH to estimate wireless channels over which the PDSCH is transmitted, wherein large scale properties of the wireless channels corresponding to DM-RSs that belong to the same quasi-co-located antenna port group are assumed to be the same.

In Example 12, the subject matter of Example 11 or any of the Examples herein may optionally include wherein the processing circuitry is to: demodulate the PDSCH having two TBs and two groups of DM-RSs in an initial transmission of the PDSCH; if both TBs in the initial transmission fail to be demodulated correctly, assume that each of the two groups of DM-RSs in a retransmission of the PDSCH are separately quasi-co-located as in the initial transmission; and, if only one of the TBs in the initial transmission fails to be demodulated correctly, assume that all DM-RSs in a retransmission of the PDSCH are quasi-co-located.

In Example 13, the subject matter of Example 11 or any of the Examples herein may optionally include wherein the processing circuitry is to decode DCI in the PDCCH that identifies one or more of reference signals that include cell-specific reference signals (CRSs) and channel station information reference signals (CSI-RSs) that are to be assumed to be quasi-co-located with one of the DM-RS antenna port groups.

In Example 14, the subject matter of Example 11 or any of the Examples herein may optionally include wherein the processing circuitry is to assume quasi-co-location between DM-RS antenna ports in a group and associated reference signals.

In Example 15, the subject matter of Example 11 or any of the Examples herein may optionally include wherein the large scale parameters of the wireless channels include one or more of average delay, delay spread, Doppler shift, Doppler spread and average gain.

In Example 16, a computer-readable storage medium comprises instructions to cause processing circuitry of a user equipment (UE), upon execution of the instructions by the processing circuitry, to: decode a radio resource control (RRC) configuration message from a base station (BS) that configures the UE with first and second channel state information (CSI) processes for reporting CSI based upon CSI reference signals (CSI-RS) transmitted from coordinated multi-point (CoMP) transmission points (TPs); wherein each of the first and second CSI processes has a configuration that includes a CSI process identification (ID), a non-zero power (NZP) CSI-RS resource for channel measurement, and a CSI interference measurement (CSI-IM) resource for interference measurement; wherein the second CSI process configuration further includes the ID of the first CSI process to indicate that the first CSI process is a reference CSI process for the second CSI process; calculate a channel estimate and an interference estimate for the first CSI process, wherein the channel estimate for the first CSI process is based upon measurement of the NZP CSI-RS resource belonging to the first CSI process and the interference estimate for the first CSI process is based upon measurement of the CSI-IM resource belonging to the first CSI process; calculate a channel estimate and an interference estimate for the second CSI process, wherein the channel estimate for the second CSI process is based upon measurement of the NZP CSI-RS resource belonging to the second CSI process and the interference estimate for the second CSI process is based upon measurement of the CSI-IM resource belonging to the second CSI process combined with the channel estimate for the first CSI process; and, encode a first CSI report for the first CSI process and a second CSI report for the second CSI process for transmission to the BS.

In Example 17, the subject matter of Example 16 or any of the Examples herein may optionally include instructions to, in order to estimate interference for the second CSI process, use the measurement of the CSI-IM resource belonging to the second. CSI process combined with channel measurements obtained from the NZP CSI-RS resource of the reference CSI process and components of the first CSI report for the first CSI process that include any or all of a CQI (channel quality indicator), CRI (CSI-RS resource indicator), RI (rank indicator) and PMI (precoding matrix indicator).

In Example 18, the subject matter of Example 16 or any of the Examples herein may optionally include instructions to only use components of the first CSI report for the reference CSI process to calculate the interference estimate for the second CSI process after the first CSI report for the reference CSI process has been completed.

In Example 19, the subject matter of Example 16 or any of the Examples herein may optionally include wherein the first CSI report for the reference CSI process is deemed completed when {CRI, RI, PMI, CQI} are reported, when {CRI, RI, PMI} are reported, when {RI, PMI} are reported, or when {RI, PMI, CQI} are reported, wherein a PMI is reported when i1 and i2 indices are reported.

In Example 20, the subject matter of Example 16 or any of the Examples herein may optionally include instructions to, in the absence of any of the CRI, RI, or PMI calculated by the reference CSI process, calculate the interference estimate for the second CSI process using the default values of the CRI, RI, or PMI corresponding to CRI=0, RI=1 and a PMI equal to the lowest index allowed by a codebook subset restriction.

In Example 21, a computer-readable storage medium comprises instructions to cause processing circuitry of a user equipment (UE), upon execution of the instructions by the processing circuitry, to perform the functions of the processing circuitry as recited in any of Examples 1 through 15.

In Example 22, a method for operating a UE comprises performing the functions of the processing circuitry as recited by any of Examples 1 through 15.

In Example 23, an apparatus for a UE comprises means for performing the functions of the processing circuitry as recited by any of Examples 1 through 15.

In Example 24, an apparatus for an eNB or gNB comprises memory and processing circuitry, where the processing circuitry is to encode messaging to configure a UE to operate as recited by any of Examples 1-15.

In Example 25, an apparatus for a gNB or eNB comprises means for performing the functions of the processing circuitry as recited by Example 24.

In Example 26, a computer-readable storage medium comprises instructions to cause processing circuitry of a base station, upon execution of the instructions by the processing circuitry, to perform the functions of the processing circuitry as recited in Example 24.

In Example 27, the subject matter of any of the Examples herein may optionally include a radio transceiver having one or more antennas connected to the processing circuitry.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect. An example LTE system includes a number of mobile stations, defined by the LTE specification as User Equipment (UE), communicating with a base station, defined by the LTE specifications as an eNodeB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to 1/10 of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the disclosure is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the disclosure is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus, comprising:
   at least one processor configured to cause a user equipment (UE) to:
   decode a radio resource control (RRC) configuration message from a base station (BS) that configures the UE with a type C quasi-co-location (QCL) configuration, wherein the type C QCL configuration specifies that demodulation reference signal (DM-RS) antenna ports used to transmit a same codeword (CW) or transport block (TB) in a physical downlink shared channel (PDSCH) are considered to be a quasi-co-located group;
   decode downlink control information (DCI) in a physical downlink control channel (PDCCH) that schedules transmission of the PDSCH, wherein the DCI is decoded to identify the DM-RS antenna ports, MIMO (multi-input multi-output) layers, and TBs of the PDSCH to be transmitted by the BS, and wherein the DCI is decoded to determine that the PDSCH to be transmitted by the BS is an initial transmission or retransmission; and
   demodulate the PDSCH by using DM-RSs in the PDSCH to estimate wireless channels over which the PDSCH is transmitted, wherein large scale properties of the wireless channels corresponding to DM-RSs that belong to the same quasi-co-located antenna port group are assumed to be the same.

2. The apparatus of claim 1 wherein the at least one processor is further configured to:
demodulate the PDSCH having two TBs and two groups of DM-RSs in an initial transmission of the PDSCH;
if both TBs in the initial transmission fail to be demodulated correctly, assume that each of the two groups of DM-RSs in a retransmission of the PDSCH are separately quasi-co-located as in the initial transmission; and
if only one of the TBs in the initial transmission fails to be demodulated correctly, assume that all DM-RSs in a retransmission of the PD SCH are quasi-co-located.

3. The apparatus of claim 1 wherein the at least one processor is further configured to decode DCI in the PDCCH that identifies one or more of reference signals that include cell-specific reference signals (CRSs) and channel station information reference signals (CSI-RSs) that are to be assumed to be quasi-co-located with one of the DM-RS antenna port groups.

4. The apparatus of claim 3, wherein the CSI-RSs are further useable by the UE to produce a CSI report.

5. The apparatus of claim 4, wherein the CSI report is transmitted back to a serving cell by a physical uplink control channel (PUCCH) or a physical uplink shared channel (PUSCH).

6. The apparatus of claim 1, wherein the at least one processor is further configured to assume quasi-co-location between DM-RS antenna ports in a group and associated reference signals.

7. The apparatus of claim 1, wherein the large scale parameters of the wireless channels include one or more of average delay, delay spread, Doppler shift, Doppler spread and average gain.

8. A user equipment (UE), comprising:
wireless communication circuitry; and
at least one processor coupled to the wireless communication circuitry and configured to cause a user equipment (UE) to:
decode a radio resource control (RRC) configuration message from a base station (BS) that configures the UE with a type C quasi-co-location (QCL) configuration, wherein the type C QCL configuration specifies that demodulation reference signal (DM-RS) antenna ports used to transmit a same codeword (CW) or transport block (TB) in a physical downlink shared channel (PDSCH) are considered to be a quasi-co-located group;
decode downlink control information (DCI) in a physical downlink control channel (PDCCH) that schedules transmission of the PDSCH, wherein the DCI is decoded to identify the DM-RS antenna ports, MIMO (multi-input multi-output) layers, and TBs of the PDSCH to be transmitted by the BS, and wherein the DCI is decoded to determine that the PDSCH to be transmitted is an initial transmission or retransmission; and
demodulate the PDSCH by using DM-RSs in the PDSCH to estimate wireless channels over which the PD SCH is transmitted, wherein large scale properties of the wireless channels corresponding to DM-RSs that belong to the same quasi-co-located antenna port group are assumed to be the same.

9. The UE of claim 8, wherein the at least one processor is further configured to:
demodulate the PDSCH having two TBs and two groups of DM-RSs in an initial transmission of the PDSCH;
if both TBs in the initial transmission fail to be demodulated correctly, assume that each of the two groups of DM-RSs in a retransmission of the PDSCH are separately quasi-co-located as in the initial transmission; and
if only one of the TBs in the initial transmission fails to be demodulated correctly, assume that all DM-RSs in a retransmission of the PD SCH are quasi-co-located.

10. The UE of claim 8 wherein the at least one processor is further configured to decode DCI in the PDCCH that identifies one or more of reference signals that include cell-specific reference signals (CRSs) and channel station information reference signals (CSI-RSs) that are to be assumed to be quasi-co-located with one of the DM-RS antenna port groups.

11. The UE of claim 10, wherein the CSI-RSs are further useable by the UE to produce a CSI report.

12. The UE of claim 11, wherein the CSI report is transmitted back to a serving cell by a physical uplink control channel (PUCCH) or a physical uplink shared channel (PUSCH).

13. The UE of claim 8, wherein the at least one processor is further configured to assume quasi-co-location between DM-RS antenna ports in a group and associated reference signals.

14. The UE of claim 8, wherein the large scale parameters of the wireless channels include one or more of average delay, delay spread, Doppler shift, Doppler spread and average gain.

15. A method, comprising:
by a user equipment (UE):
decoding a radio resource control (RRC) configuration message from a base station (BS) that configures the UE with a type C quasi-co-location (QCL) configuration, wherein the type C QCL configuration specifies that demodulation reference signal (DM-RS) antenna ports used to transmit a same codeword (CW) or transport block (TB) in a physical downlink shared channel (PDSCH) are considered to be a quasi-co-located group;
decoding downlink control information (DCI) in a physical downlink control channel (PDCCH) that schedules transmission of the PDSCH, wherein the DCI is decoded to identify the DM-RS antenna ports, MIMO (multi-input multi-output) layers, and TB s of the PDSCH to be transmitted by the BS, and wherein the DCI is decoded to determine that the PDSCH to be transmitted by the BS is an initial transmission or retransmission; and,
demodulating the PDSCH by using DM-RSs in the PDSCH to estimate wireless channels over which the PD SCH is transmitted, wherein large scale properties of the wireless channels corresponding to DM-RSs that belong to the same quasi-co-located antenna port group are assumed to be the same.

16. The method of claim 15, further comprising:
demodulating the PDSCH having two TBs and two groups of DM-RSs in an initial transmission of the PDSCH;
if both TBs in the initial transmission fail to be demodulated correctly, assuming that each of the two groups of DM-RSs in a retransmission of the PDSCH are separately quasi-co-located as in the initial transmission; and
if only one of the TBs in the initial transmission fails to be demodulated correctly, assuming that all DM-RSs in a retransmission of the PD SCH are quasi-co-located.

17. The method of claim 15, further comprising:
decoding DCI in the PDCCH that identifies one or more of reference signals that include cell-specific reference signals (CRSs) and channel station information reference signals (CSI-RSs) that are to be assumed to be quasi-co-located with one of the DM-RS antenna port groups.

18. The method of claim 17, wherein the CSI-RSs are further useable by the UE to produce a CSI report.

19. The method of claim 15, further comprising:
assuming quasi-co-location between DM-RS antenna ports in a group and associated reference signals.

20. The method of claim 15, wherein the large scale parameters of the wireless channels include one or more of average delay, delay spread, Doppler shift, Doppler spread and average gain.

* * * * *